UNITED STATES PATENT OFFICE.

PROSPER A. MAIGNEN, OF LONDON, ENGLAND.

COMPOUND FOR PURIFYING WATER.

SPECIFICATION forming part of Letters Patent No. 355,773, dated January 11, 1887.

Application filed May 25, 1885. Serial No. 166,640. (No specimens.) Patented in England February 9, 1884, No. 3,038.

*To all whom it may concern:*

Be it known that I, PROSPER AUGUSTE MAIGNEN, a French subject, and residing at London, England, have invented an Improved Compound for the Elimination of Dissolved Matter from Water, (for which I have obtained a patent in England, dated February 9, 1884, No. 3,038,) of which the following is a specification.

My invention relates to an improved process for the softening of hard water—that is to say, the elimination of certain dissolved matters which cause hardness—and it is designed to effect this object in a simple, accurate, and expeditious manner, and to eliminate undesirable matters held in solution, in proportion and to any extent desirable. It will be applicable to drinking-water, to the treatment of feed-water to steam-boilers, and to the treatment of water generally in manufacturing processes where purity and softness are desirable.

I have found that by preparing in a very dry powder the substances which I use to attack the different salts in solution, and which I shall call "reagents," thorough permeation of the water to be treated is secured.

The feed of my compound may be effected for large quantities of water by any known mechanical device, or the compound may be added by hand in as diffuse a manner as possible for treating small quantities of water.

The elements of my compound, being of different degrees of solubility, attack the various salts which it is desired to throw out of solution successively, or in such a way that the whole of the salts are effectively decomposed and thrown out of solution.

The compound, as above described, effects the precipitation of all the bicarbonate of lime, the sulphate of lime, and salts of magnesia which may be in the water, by the action of the single powder, leaving the softened water chemically neutral and with the taste improved, provided only the respective ingredients be properly proportioned to the matter to be eliminated, as determined by test of the water. In order to effect this object I have chosen substances which are cheap, and which act in such a way as to cause the precipitated matters rapidly to subside, so as to leave little to do in the after treatment by subsidence or filtration.

By varying the constituents of my compound proportionately to the composition of the water (previously ascertained by testing) and the quantity of water to be treated I may precipitate the whole or any certain quantity and one or other or the whole of the matters to be eliminated.

My compound then, to fulfill these conditions, I form of hydrate of lime, calcined soda, and alum, which are thoroughly triturated and intimately mingled. Where the water to be treated is sea-water, I add the further constituent pyrolusite.

If, for example, the water to be treated is found by test to contain ten (10) grains of carbonate of lime, three (3) grains of sulphate of lime, and two (2) grains of magnesium salts, per gallon, which is a very common proportion, then my said compound will consist of ten (10) grains of caustic lime, five (5) grains of calcined soda, and one (1) grain of alum for each gallon of water.

Having now fully described my invention and the manner in which it is to be performed, be it known that what I claim is—

The within-described compound for softening water, consisting of hydrate of lime, alum, and calcined soda, finely triturated and intimately intermixed in proportions suited to the matter to be eliminated, substantially as and for the purpose set forth.

In witness whereof I have hereunto set my my hand this 6th day of June, 1884.

P. A. MAIGNEN.

Witnesses:
SAM. P. WILDING,
RICHARD A. HOFFMANN.